United States Patent
Dardas et al.

(10) Patent No.: US 6,932,848 B2
(45) Date of Patent: Aug. 23, 2005

(54) HIGH PERFORMANCE FUEL PROCESSING SYSTEM FOR FUEL CELL POWER PLANT

(75) Inventors: Zissis Dardas, Worcester, MA (US); Thomas Henry Vanderspurt, Glastonbury, CT (US); Nikunj Gupta, New Britain, CT (US); Shubhro Ghosh, Manchester, CT (US); Ying She, Worcester, MA (US)

(73) Assignee: UTC Fuel Cells, LLC, South Windsor, CT (US)

(*) Notice: Subject to any disclaimer, the term of this patent is extended or adjusted under 35 U.S.C. 154(b) by 132 days.

(21) Appl. No.: 10/402,506

(22) Filed: Mar. 28, 2003

(65) Prior Publication Data

US 2004/0187384 A1 Sep. 30, 2004

(51) Int. Cl.[7] .............................. C01B 3/48; H01M 8/10; B01D 53/62
(52) U.S. Cl. ....................... 48/127.7; 422/177; 422/190; 422/196; 423/246; 429/19
(58) Field of Search .......................... 48/197 R, 127.1, 48/127.7; 422/177, 190, 196; 429/19; 423/246

(56) References Cited

U.S. PATENT DOCUMENTS

| | | | |
|---|---|---|---|
| 3,565,830 A | 2/1971 | Keith et al. | 252/466 |
| 3,825,501 A | 7/1974 | Muenger | 252/373 |
| 3,870,455 A | 3/1975 | Hindin | 431/7 |
| 4,021,366 A | 5/1977 | Robin et al. | 252/373 |
| 4,157,316 A | 6/1979 | Thompson et al. | 252/462 |
| 4,170,573 A | 10/1979 | Ernest et al. | 252/462 |
| 4,171,288 A | 10/1979 | Keith et al. | 252/462 |
| 4,297,246 A | 10/1981 | Cairns et al. | 252/465 |
| 4,308,176 A | 12/1981 | Kristiansen | 252/463 |
| 4,331,565 A | 5/1982 | Schaefer et al. | 252/462 |
| 4,476,246 A | 10/1984 | Kim et al. | 502/304 |
| 4,585,752 A | 4/1986 | Ernest | 502/314 |

(Continued)

FOREIGN PATENT DOCUMENTS

| | | |
|---|---|---|
| EP | 0298351 | 1/1989 |
| EP | 1 046 612 A1 | 10/2000 |
| EP | 1 256 545 A1 | 7/2001 |
| EP | 1 161 991 A1 | 12/2001 |
| EP | 1 256 545 | * 11/2002 |
| JP | 10202101 | 8/1998 |
| JP | 1133294 | 12/1999 |
| JP | 2000-178007 | * 6/2000 |
| WO | WO 96/23573 | 8/1996 |
| WO | WO 97/44123 | 11/1997 |
| WO | WO 01/03828 | 1/2001 |

OTHER PUBLICATIONS

Journal of Catalysis 96, 285–287 (1985) Methanation and Water–Gas Shift Reaction over Pt/CeO2.*

(Continued)

*Primary Examiner*—N. Bhat
(74) *Attorney, Agent, or Firm*—Stephen A. Schneeberger

(57) ABSTRACT

A fuel processing system (FPS) (110) is provided for a fuel cell power plant (115) having a fuel cell stack assembly (CSA) (56). A water gas shift (WGS) reaction section (12, 120) of the FPS (110) reduces the concentration of carbon monoxide (CO) in the supplied hydrocarbon reformate, and a preferred oxidation (PROX) section (40) further reduces the CO concentration to an acceptable level. The WGS section (12, 120) includes a reactor (124) with a high activity catalyst for reducing the reformate Co concentration to a relatively low level, e.g., 2,000 ppmv or less, thereby relatively reducing the structural volume of the FPS (110). The high activity catalyst is active at temperatures as low as 250° C., and may be a noble-metal-on-ceria catalyst of Pt and Re on a nanocrystaline, cerium oxide-based support. Then only a low temperature PROX reactor (46) is required for preferential oxidation in the FPS (110).

18 Claims, 7 Drawing Sheets

U.S. PATENT DOCUMENTS

| | | | |
|---|---|---|---|
| 4,587,231 A | 5/1986 | Sawamura et al. | 502/304 |
| 4,629,612 A | 12/1986 | van der Wal et al. | 423/244 |
| 4,835,132 A | 5/1989 | Sambrook | 502/303 |
| 4,868,148 A | 9/1989 | Henk et al. | 502/303 |
| 5,039,503 A | 8/1991 | Sauvion et al. | 423/437 |
| 5,057,483 A | 10/1991 | Wan | 502/304 |
| 5,073,532 A | 12/1991 | Domesle et al. | 502/304 |
| 5,139,992 A | 8/1992 | Tauster et al. | 502/304 |
| 5,254,519 A | 10/1993 | Wan et al. | 502/252 |
| 5,275,997 A | 1/1994 | Ganguli et al. | 502/304 |
| 5,464,606 A | 11/1995 | Buswell et al. | 423/655 |
| 5,480,854 A | 1/1996 | Rajaram et al. | 502/304 |
| 5,490,977 A | 2/1996 | Wan et al. | 423/210 |
| 5,491,120 A | 2/1996 | Voss et al. | 502/304 |
| 5,492,878 A | 2/1996 | Fujii et al. | 502/304 |
| 5,500,198 A | 3/1996 | Liu et al. | 423/246 |
| 5,516,597 A | 5/1996 | Singh et al. | 429/30 |
| 5,532,198 A | 7/1996 | Chopin et al. | 502/304 |
| 5,744,118 A | 4/1998 | Imamura et al. | 423/593 |
| 5,788,950 A | 8/1998 | Imamura et al. | 423/593 |
| 5,830,425 A | 11/1998 | Schneider et al. | 423/437.2 |
| 5,843,195 A * | 12/1998 | Aoyama | 48/127.7 |
| 5,895,772 A | 4/1999 | Grigorova et al. | 502/304 |
| 5,945,369 A | 8/1999 | Kimura et al. | 502/304 |
| 5,948,683 A | 9/1999 | Koermer et al. | 436/37 |
| 5,990,040 A | 11/1999 | Hu et al. | 502/342 |
| 6,033,634 A | 3/2000 | Koga | 422/198 |
| 6,040,265 A | 3/2000 | Nunan | 502/242 |
| 6,107,240 A | 8/2000 | Wu et al. | 502/304 |
| 6,120,923 A | 9/2000 | Van Dine et al. | 429/17 |
| 6,120,925 A | 9/2000 | Kawatsu et al. | 429/40 |
| 6,133,194 A | 10/2000 | Cuif et al. | 502/506 |
| 6,159,256 A | 12/2000 | Bonville, Jr. et al. | 48/61 |
| 6,204,219 B1 | 3/2001 | Brezny et al. | 502/304 |
| 6,299,994 B1 | 10/2001 | Towler et al. | 429/17 |
| 6,322,917 B1 | 11/2001 | Acker | 429/17 |
| 6,326,329 B1 | 12/2001 | Nunan | 502/242 |
| 6,409,939 B1 | 6/2002 | Abdo et al. | 252/373 |
| 6,455,182 B1 | 9/2002 | Silver | 429/17 |
| 6,562,088 B2 * | 5/2003 | Ukai et al. | 48/197 R |
| 6,692,545 B2 * | 2/2004 | Gittleman et al. | 48/128 |
| 6,733,552 B1 * | 5/2004 | Taguchi et al. | 48/127.9 |
| 6,787,118 B2 * | 9/2004 | Roark et al. | 423/247 |
| 2001/0002248 A1 | 5/2001 | Ukai et al. | 423/652 |
| 2002/0071806 A1 | 6/2002 | Sabacky et al. | 423/593 |
| 2002/0073895 A1 | 6/2002 | Barnes et al. | 106/451 |
| 2002/0110519 A1 | 8/2002 | Ying et al. | 423/600 |
| 2002/0131915 A1 * | 9/2002 | Shore et al. | 422/177 |
| 2003/0129100 A1 * | 7/2003 | Ukai et al. | 422/177 |
| 2003/0235526 A1 * | 12/2003 | Vanderspurt et al. | 423/263 |
| 2004/0048114 A1 * | 3/2004 | Shore | 429/19 |

OTHER PUBLICATIONS

S. Hilaire, "A comparative study of water–gas shift reaction over ceria supported metallic catalysts", Applied Catalysis A: General 215 (2001), pp. 271–278.

Qi Fu, "Nanostructured Au–CeO2 catalysts for low–temperature water–gas shift", Catalysis Letters, vol. 77, No. 1–3, (2001), pp. 87–95.

S. Hilaire, "A comparative study of water–gas shift reaction over ceria supported metallic catalysts", Applied Catalysis A: General 215 (2001), pp. 271–278.

Qi Fu, "Nanostructured Au–CeO2 catalysts for low–temperature water–gas shift", Catalysis Letters, vol. 77, No. 1–3, (2001), pp. 87–95.

E. S. Putna, et al, "Ceria films on zirconia substrates: models for understanding oxygen storage properties", Catalysis Today, 50 (1999), pp. 343–352.

Paolo Fornasiero, et al, "On the rate determining step in the reduction of CeO2–ZrO2 mixed oxides", Applied Catalysis B: Environmental, 22 (1999), pp. L11–L14.

S. Rossignol, et al, "Preparation of zirconia–ceria materials by soft chemistry", Catalysis Today, 50 (1999), pp. 261–270.

T. Bunluesin, et al, "Studies of the water–gas shift reaction on ceria–supported Pt, Pd, and Rh: implications for oxygen storage properties", Applied Catalysis, B: Environmental, (1998), pp. 107–114.

G. Colon, et al, "Surface and structural characterization of CeZr1–xO2 CEZIRENCAT mixed oxides as potential three– way catalyst promoters", J. Chem. Soc., Faraday Trans., 94 (1998), pp. 3717–3726.

O. A. Kirichenko, et al, "Effect of coprecipitation conditions on the surface area, phase composition, and reducibility of Ce2–ZrO2–Y2O3 materials for automotive three–way catalysts", Preparation of Catalysts VII, B. Delmon, et al, editors, (1998), pp. 411–420.

Carla E. Hori, et al, "Thermal stability of oxygen strorage properties in a mixed CeO2–ZrO2 system", *Applied Catalysts B: Environmental*, 16 (1998), pp. 105–11.

Lj. Kundakovic, et al, "Cu– and Ag–modified cerium oxide catalysts for methane oxidation", *Journal of Catalysis* 179 (1998), pp. 203–221.

Daniela Terribile, et al, "The preparation of high surface area CeO2–ZrO2 mixed oxides by a surfactant–assisted approach", *Catalysis Today*, 43 (1998), pp. 79–88.

Lj. Kundakovic, et al, "Reduction characteristics of copper oxide in cerium and zirconium oxide systems", *Applied Catalysis A: General*, 171 (1998), pp. 13–29.

G. Vlaic, et al, "Relationship between the zirconia–promoted reduction in the Rh–loaded Ce0.5Zr0.5O2 mixed oxide and the Zr–O local structure", *Journal of Catalysis* 168 (1997), pp. 386–392.

Polona Vidmar, et al, "Effects of trivalent dopants on the redox properties of Ce0.6Zr0.4O2 mixed oxide", *Journal of Catalysis* 171 (1997), pp. 160–168.

H. Cordatos, et al, "Effects of ceria structure on oxygen migration for Rh/ceria catalysts", *J. of Physical Chemistry*, (1996) 100, pp. 785–789.

P. Fornasiero, et al, "Modification of the redox behaviour of CeO2 induced by structural doping with ZrO2", *J. of Catalysis* 164 (1996), pp. 173–183.

Yuhan Sun, et al, "Importance of homogeneity in the stabilisation of high surface area CeO2–ZrO2 aerogels", *J. of Material Chemistry* 6(6) (1996), pp. 1025–1029.

P. Fornasiero, et al, "Rh–loaded CeO2–ZrO2 solid solutions as highly efficient oxygen exchangers: dependence of the reduction behavior and the oxygen storage capacity on the structural properties", *J. of Catalysis* 151 (1995), pp. 168–177.

* cited by examiner

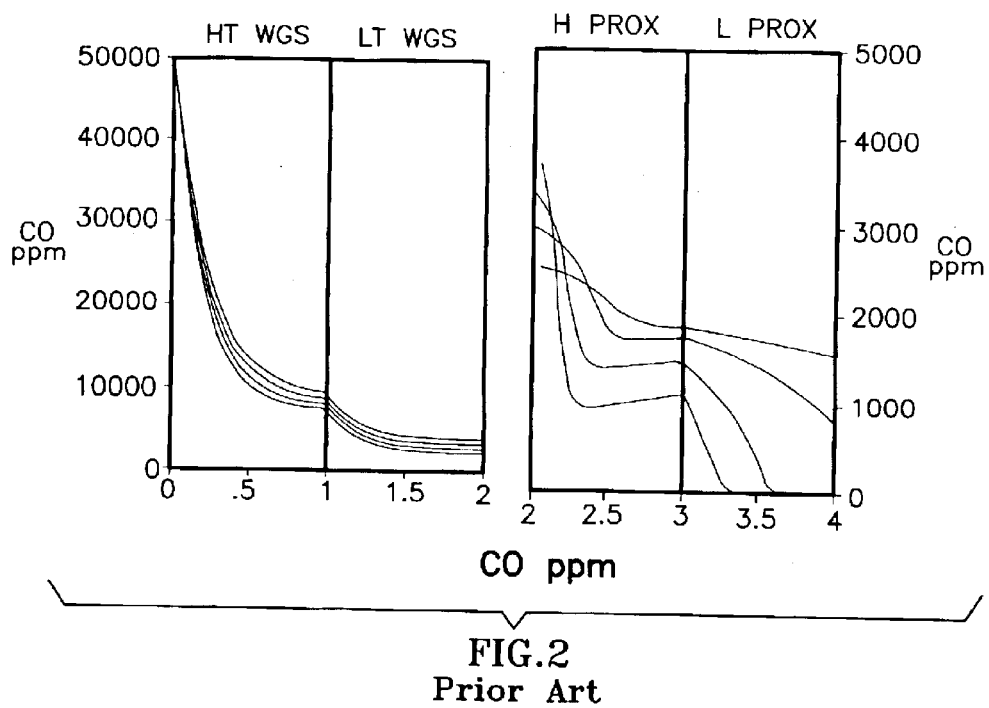
FIG.2
Prior Art
FIG.3
Prior Art
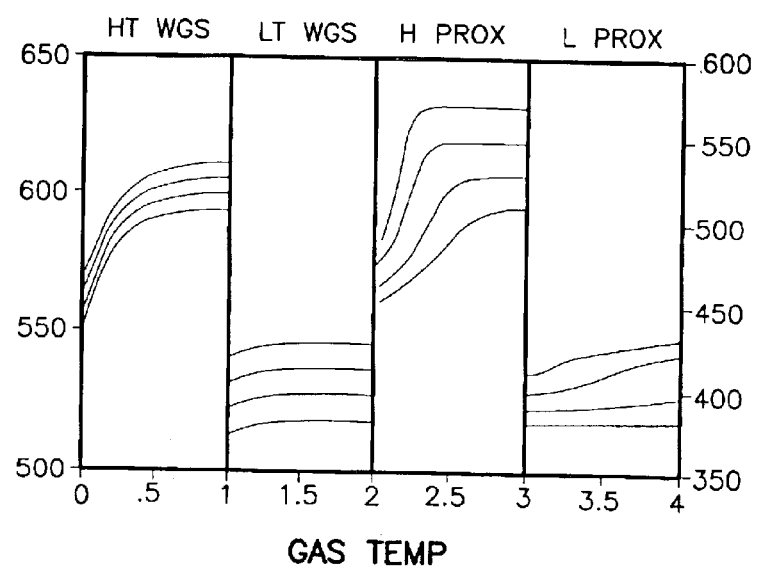

HIGH PERFORMANCE FUEL PROCESSING SYSTEM FOR FUEL CELL POWER PLANT

TECHNICAL FIELD

This invention relates to fuel processing and more particularly to processing fuel for use with fuel cells. More particularly still, the invention relates to a fuel processing system for use with low operating temperature fuel cell power plants, such as a PEM fuel cell.

BACKGROUND ART

Fuel cell power plants are used increasingly to provide electrical power for a variety of end uses. The fuel cell power plant typically includes one or more fuel cell stack assemblies (CSA), each consisting of an anode, a cathode, and an electrolyte that separates the anode and cathode. Fuel reactant (for a PEM fuel cell), which is typically a hydrogen-rich stream, enters the anode of the CSA, and an oxidant reactant, typically air, enters the cathode. A catalyst in the anode causes the hydrogen to oxidize, resulting in the creation of hydrogen ions, which pass through the electrolyte to the cathode to create the electrical current of the power plant. In addition to the CSA, the power plant typically also includes a fuel processing system (FPS) for converting a hydrocarbon feedstock, such as natural gas, LPG, gasoline, and/or numerous others, to the hydrogen-rich fuel stream, which fuel stream may be referred to as "reformate" because of an included process of reformation.

Although the types of fuel cells vary according to their electrolytes, they may also be viewed as varying according to their operating temperatures. One type of fuel cell that is receiving considerable attention for application to automotive and other uses is the PEM fuel cell that employs a solid polymer electrolyte referred to as a proton exchange membrane. These fuel cells typically operate at temperatures of 60° C. to 83° C., though temperatures to less than 38° C. and as great as 120° C. are possible, and within a pressure range of about one to five atmospheres. Moreover, the catalyst associated with the anode of a PEM fuel cell is particularly susceptible to being "poisoned" by carbon monoxide (CO) that may be contained in the reformate.

Accordingly, the fuel processing system (FPS) of the power plant is not only required to reform a hydrocarbon feedstock to a hydrogen-rich stream to fuel the anode, but it is also required to convert significant levels of CO in the reformate to carbon dioxide ($CO_2$) to thereby reduce the concentration of CO to a level acceptable at the anode. The FPS may similarly be required to remove or convert objectionable sulfur species in the hydrocarbon feedstock in order to avoid damage to the CSA.

In a typical FPS 10 of a fuel cell power plant 15 of the prior art, a portion of which is depicted in FIG. 1, a desulfurizer (not shown) removes organic sulfur components from the fuel, typically at a relatively early stage in the reformation and conversion process. A reformer (not shown) then converts (or reforms) the fuel in a known manner, in the presence of steam (and air), to a reformate mixture 11 of $H_2$, CO, $CO_2$, $H_2O$, (and $N_2$). Thereafter, the desulfurized reformate 11 is supplied to a high-temperature water gas shift reactor (HT WGS) 12 which typically includes a vaporizer 14 and a catalytic reactor 16. Requisite supplies and control of air, steam and/or water to the relevant sections of the FPS 10, though not shown, are implied and well understood. The HT NGS 12 reduces the CO level (i. e. concentration) and enriches the hydrogen level by supplying additional steam or moisture via the vaporizer 14 and reacting it with the reformate 11 in the reactor 16, according to the reaction (and heat of reaction):

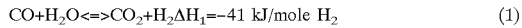

$$CO+H_2O <=> CO_2+H_2 \Delta H_1=-41 \text{ kJ/mole } H_2 \quad (1)$$

This reaction is exothermic (in the forward direction) and equilibrium-limited, with lower temperatures favoring higher CO conversions. However, the reaction rate of the HT WGS catalyst increases exponentially with temperature. Thus, the existing practice that optimizes thermodynamics and kinetics of prior existing HT WGS catalysts is to use a second, or low-temperature, water gas shift reactor (LT WGS) 20. The LT WGS 20 typically includes a water vaporizer or cooler (heat exchanger) 22 preceding a catalytic reactor 24. The vaporizer 22 serves as a cooling device and also provides additional steam for the reactor 24. In some architectures the vaporizer may be replaced or assisted by a cooler which will serve to cool the reformate and at the same time use the heat to pre-heat the feed. The catalyst in the LT WGS reactor 24 has typically been Cu/ZnO or the like, or more recently may have been noble metal-based.

Referring further to FIG. 1, the CO level entering the HT WGS 12 may typically be in excess of 100,000 ppmv (parts per million-volume-wet basis) and may be reduced to about 15,000 to 30,000 ppmv by that reactor. The LT WGS 20 further reduces the CO level to about 10,000 to 5,000 ppmv. However, to avoid poisoning the anode 54, it is necessary for the CO level to be below 50 ppmv, and preferably less than 10 ppmv. To further reduce the CO levels to those target levels, the reformate stream from the LT WGS 20 is applied to a preferential oxidation section. This catalytic approach, however, utilizes air to "burn" the CO to $CO_2$, but since $H_2$ is the major constituent in the reformate gas stream (~50%–30% $H_2$ vs. 1%–0.5% CO), it also burns with CO. These exothermic reactions are shown below, along with the heat of reaction:

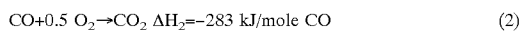

$$CO+0.5\ O_2 \rightarrow CO_2\ \Delta H_2=-283 \text{ kJ/mole CO} \quad (2)$$

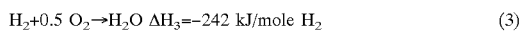

$$H_2+0.5\ O_2 \rightarrow H_2O\ \Delta H_3=-242 \text{ kJ/mole } H_2 \quad (3)$$

Uniform mixing of the reformate with inlet air assures homogeneous mixing and therefore, effective operation by avoidance of hot spots. To reduce the amount of $H_2$ consumed, this preferential oxidation process has been performed in two, usually adiabatic, stages, as depicted.

The reformate from LT WGS 20 is fed to a high temperature CO preferential oxidizer subsystem (H PROX) 30 (sometimes also referred to as PROX 1), which includes an air mixer 32 followed by a cooler 34 in turn followed by a catalytic reactor 36. An $O_2$/CO ratio slightly above the stoichiometry of reaction (2) is used (in the 0.5–2 regime) and the CO is reduced from the range of 10,000–5,000 ppmv to the range of about 2,000 to 500 ppmv. The reformate from H PROX reactor 36 is then fed to a low temperature CO preferential oxidizer subsystem (L PROX) 40 (sometimes also referred to as PROX 2), which includes an air mixer 42 followed by a cooler 44 in turn followed by a catalytic reactor 46. Here, a significantly higher $O_2$/CO ratio (1.0–4.0, or more) than the stoichiometric ratio for the reaction (2) is used to ensure elimination of CO to concentrations less than 50 ppmv, and typically less than 10 ppmv. Finally, reformate from the L PROX 40 is flowed through an anode precooler 50 and thence to the anode 54 of fuel cell stack assembly (CSA) 56.

Further consideration is given here to various limitations or complexities that arise with the use of the 2-stage PROX section, and particularly the H PROX section, or subsystem,

30. The combined CO selectivity of the two-stage PROX process is about 35%, i.e., for each CO molecule consumed, two $H_2$ molecules are consumed. Thus, there is an efficiency penalty during this process. If it is assumed, for example, that 8,000 ppmv of CO is oxidized in the two-stage PROX system, the overall $H_2$ consumed is roughly 2×8,000 ppmv= 16,000 ppmv, or 1.6%, of which up to 75%, i.e. up to 12,000 ppmv, is consumed in the H PROX reactor 36. Moreover, since the CO reaction is highly exothermic and the levels of CO that are consumed are relatively high, the temperature in this adiabatic reactor typically increases more than 100° C. Due to the high reaction exothermicity, it may be prone to overheating, with a concomitant reverse shift reaction that converts $CO_2$ back to CO, or to overcooling, which fails to adequately oxidize the CO. To avoid overheating, it is necessary to carefully regulate the temperature of reformate entering the H-PROX reactor 36, this typically being done via the heat exchanger/cooler 34 in the H PROX section 30. However, as noted, it is equally important to avoid overcooling since the catalyst of the H PROX reactor 36 has a high sensitivity to the inlet temperature of the reformate and to the CO concentration. While the latter is governed by the HT WGS 12 and the LT WGS 20, the former is governed principally by careful regulation of the heat exchanger/cooler 34 in the H PROX section 30. Indeed, if overcooling occurs and the reformate gas stream temperature at the inlet to the H PROX reactor 36 is lower than the catalyst "light-off" temperature, the catalyst will remain inactive, thereby passing unacceptably high levels of CO to the L-PROX section 40 and also creating a "cold" reformate gas stream. Since the L-PROX reactor is designed to operate for an inlet CO level of less than about 2,000 ppmv (wet basis), then the high CO levels may be passed to the anode 54 of the CSA 56 and poison the catalyst there.

A further illustration of the sensitivity of the WGS sections 12, 20 and PROX sections 30, 40 to inlet flow rates, with respect to CO levels and to gas temperatures, is depicted in FIGS. 2 and 3 respectively. The reformate and coolant throughput rates correlate proportionally with system power output. These Figures depict the response of those several stages of the FPS 15 during a power or load step-down, in the absence of a sophisticated control system. More specifically, it is assumed that the associated control system (not shown) adjusts the coolant flow rate in the pre and post H-PROX reactor heat exchangers 34, and 44, simply and directly in accordance with changes of the flow rate of the reformate. During a rapid load step-down of the system from full power (100% to a fraction of that power, e. g. 80%), the reformate flow will be 80% that of full power and therefore, the flow rate of these heat exchangers is 80% that of full power. Thus, the depictions of FIGS. 2 and 3 illustrate that while the system is operating at full power steady state, the desired reduction in CO may be obtained, yet when the system undergoes a load step-down and may be operating at only 70% or 80%, there is a serious degradation in the CO conversion/removal capability of the two PROX sections 30 and 40. This is because of overcooling, and demonstrates the need for a sophisticated coolant control system to avoid these characteristics and their adverse consequences.

A similar behavior is depicted in FIG. 4, which illustrates a sharp increase in the CO level at the output of L PROX reactor 46 when the power plant 10 experiences a 30% step-down in power (from 100% to 70%) and the control of the coolant system provides only a proportional 30% reduction in the coolant flow rate in the heat exchangers 32, 44. This creates an "overcooled" condition that adversely affects the reaction in the H PROX 36, and thus also the resultant CO level in the reformate issuing from the L PROX 46 downstream thereof.

Further, this high exothermicity of the H PROX reactor 36 can lead to unstable operation states referred to as "bifurcations", in which the system may be seen to operate in multiple "steady states". This is due to the coupling effects in the changes of the $O_2$/CO ratio and the coolant flow rates during operation of the system in a transient mode, and leads to either serious overheating, i. e., temperature runaway, or to overcooling, i. e., process extinguishing. As in the examples described above, these modes may be mitigated only with the use of sophisticated, and therefore expensive, coolant and air control systems.

In view of the foregoing discussion of the operating dynamics of the various reaction sections presently used, the further requirement for sophisticated and costly coolant flow control and air control will be understood and appreciated. Such need, or burden, is particularly manifested in the operation of the 2-stage PROX section in the FPS 15, which imposes certain burdens on the power plant 10, to wit, the cost, weight and volume of the PROX hardware itself as well as the extra cost of the sophisticated coolant flow and air controls required to avoid the limitations of a simpler proportional control system.

Accordingly, it is an object of the invention to provide an improved fuel processing system for a fuel cell power plant.

It is a further object of the invention to provide a fuel processing system that requires relatively less equipment.

It is a still further object of the invention to provide a fuel processing system that does not require relatively sophisticated/costly associated controls for thermal and/or air management.

It is an even further object of the invention to provide an efficient, smaller size and weight (compact) and cost effective fuel processing system for providing reformate with an acceptably low CO concentration, to a fuel cell stack assembly.

DISCLOSURE OF INVENTION

In accordance with the invention, it has been determined that use of a high performance, low-temperature water gas shift (LT WGS) catalyst, possessing relatively lower exothermicity and being active at temperatures below 250° C., can have a significant positive impact on the fuel processing system (FPS), principally through the elimination of the high temperature, first stage, H PROX reactor 36, and also the air mixer 32 and cooler 34 associated with that reactor, and secondarily by allowing the utilization of a simpler coolant control system. Additionally, or alternatively, the use of such catalyst in the LT WGS may allow the use of a relatively smaller catalyst bed and reactor for a given requirement of CO reduction in the reformate flow. The use of such a catalyst in the LT WGS reactor enables that reactor to process the reformate to exit temperatures as low as about 250° C. and below, as governed by the thermodynamic equilibrium equation, which concomitantly permits the CO concentrations to be reduced to as low as about 2,000 ppmv, or less. With the reformate at that temperature and particularly at that CO concentration, it is then possible to eliminate the H PROX and still attain the requisite CO level of less than about 50 ppmv at the output of the L PROX.

Through use of such high-performance, low-temperature, WGS catalyst in the low-temperature water gas shift reactor, the hardware and coolant and air processing in the FPS may be simplified. Specifically, it becomes possible to eliminate the high-temperature PROX subsystem previously required.

Moreover, this elimination of the H PROX subsystem allows simplification of the associated coolant and air systems, both in terms of hardware requirements and control complexity. Finally, an increase in the overall fuel cell power plant efficiency of at least 1% is achieved, since the catalyst in the H PROX would also otherwise burn hydrogen, with the amount of the efficiency increase depending upon the $CO/H_2$ ratio and the catalyst selectivity at H PROX operating conditions.

The foregoing improvements and advantages in the design and operation of the fuel processing system include reduced system cost, volumetric reduction or minimization, and enhanced performance due to higher efficiency and improved controllability during transients. These improvements and advantages arise from the recognition that by increasing the activity of a catalyst that consists of noble metals over doped ceria to at least 0.18 moles of CO per moles of Pt per sec. (moles CO/moles equiv. Pt-sec.) at 250° C. for a gas composition of 1.5%–2.5% CO, 25%–35% $H_2O$, 30–50% $H_2$, 10–14% $CO_2$, balance $N_2$, and simultaneously decreasing the CO reaction order in the LT WGS reaction from that previously assumed with the use of commercial Cu/ZnO catalysts (~1), the activity of a catalyst would become substantially independent of the CO partial pressure and the shift reaction could effect reduction of CO to lower concentrations and at lower temperatures. This allows reduction of CO concentration along the LT WGS reactor to levels predicted by the thermodynamic equilibrium equation with relatively smaller reactor volume than required by another catalyst of similar activity but a high CO reaction order, thus affording savings in reactor hardware costs and a reduction in system parasitic power.

In regard to the foregoing and in accordance with the invention, the catalyst employed in the LT WGS is high performance, and is capable of activity at relatively low temperatures below about 250° C. Certain noble metal-on-ceria-based, nanophase-structured catalysts are seen to provide such properties, with a preferred example being a supported platinum (Pt) and rhenium (Re) catalyst, with at least 1 wt %, preferably 1.5 to 8.0 wt %, and most preferably 2.0 to 5.0 wt %, of Pt and Re having a dispersion greater than 90% on a porous mixed metal oxide support.

The foregoing features and advantages of the present invention will become more apparent in light of the following detailed description of exemplary embodiments thereof as illustrated in the accompanying drawings.

BRIEF DESCRIPTION OF DRAWINGS

FIG. 2 is a graphical depiction of the sensitivity of the WGS and PROX subsystems of FIG. 1, in terms of CO concentration, to system reformate and coolant throughput rates, which in turn correlate proportionally with power output;

FIG. 3 is a graphical depiction of the sensitivity of the WGS and PROX subsystems of FIG. 1, in terms of gas temperature, to system reformate and coolant throughput rates, which in turn correlate with power output;

BEST MODE FOR CARRYING OUT THE INVENTION

The description of the prior art, with reference to FIGS. 1–4, revealed the limitations and/or sensitivities of existing FPS configurations, particularly in their requirement for both an H PROX subsystem 30 and an L PROX subsystem 40, and the further complex dependence on coolant flow for CO conversion at differing power conditions. This configuration assumed the use of a recently-developed, noble metal-based, WGS catalyst of the general type described in U.S. Pat. No. 6,455,182 for Shift Converter Having an Improved Catalyst Composition, and Method for its Use, assigned to the assignee of the present invention, in at least the LT WGS reactor 24, which catalyst typically has a high activity. The activation energy and CO reaction order for such catalyst might typically be 14 to 20 Kcal/mole of CO and 0.20 to 0.50 respectively. Similarly, the temperature of the reformate exiting from the LT WGS reactor 24 might be between 280° and 320° C. and the CO level from 10,000 to 5,000 ppmv, thus requiring the H PROX subsystem 30 to decrease the CO to 2,000 ppmv or less, in order for the L PROX subsystem 40 to reduce the CO concentration to less than 50 ppmv, and preferably less than 10 ppmv.

Figure 5:
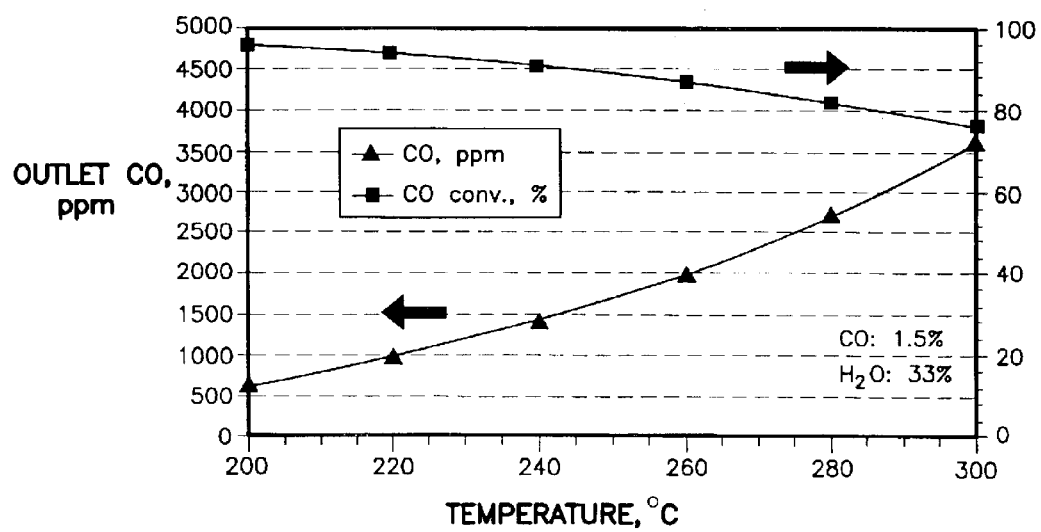
FIG. 5 graphically depicts the water gas shift equilibrium that defines CO conversion and outlet concentration as a function of outlet temperature for a particular reformate gas composition.

The relationship between CO, $H_2O$, $CO_2$, and $H_2$ (and $N_2$) concentrations in the reformate stream are governed by thermodynamic equilibrium considerations. The equilibrium concentration and conversion values for CO in the WGS reaction are plotted in FIG. 5 as a function of temperature for a specified set of inlet concentrations (% mole fractions). The plot of FIG. 5 assumes operation at a pressure of about 1.16 atmosphere, and that the reformate at the LT WGS reactor inlet has a typical composition of $H_2O$=33.0%, $H_2$=30.0%, $CO_2$=14.0%, CO=1.5%, $CH_4$=0.3%. and $N_2$=21.2%. Accordingly, the trace of the CO concentration, reveals that to achieve a concentration of about 2,000 ppmv or less, the LT WGS must operate with an exit temperature of about 250° C., or less, with gas that is close to equilibrium at that temperature.

Figure 6:
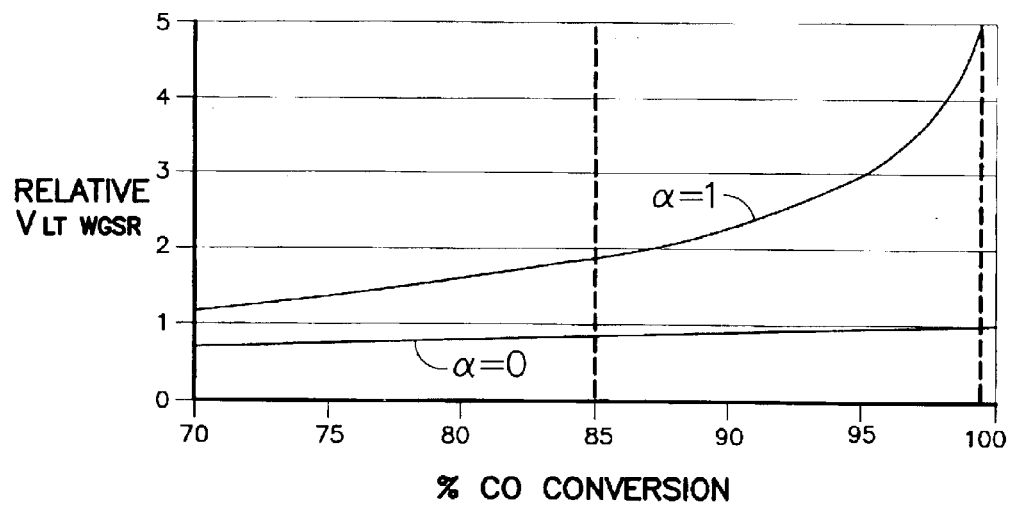
FIG. 6 is a graphical depiction of the WGS catalyst reaction rate order on CO conversion and LT WGS reactor volume for first order kinetics and zero order kinetics on CO.

In regards to the foregoing, it was determined to assess the impact of increasing the catalyst activity per mole of Pt by at least 1.5 times and decreasing the CO reaction order to the range of 0.0–0.10 from that associated with the recently-developed, high activity, noble metal-based, catalyst associated with the prior art systems. For these high performance, low-temperature WGS catalysts, it was found that the reaction rate can be expressed as a function of concentrations (or partial pressures) and temperature with the following empirical equation, based on the Arrhenius equation:

$$r = [A] e^{-Ea/RT} \left( \frac{[CO]^\alpha [H_2O]^\beta}{[H_2]^\gamma [CO_2]^\delta} \right) (1 - b_{eq}) \quad (4)$$

where [A] is proportional to the number of active sites in the catalyst, Ea is the activation energy, $b_{eq}=[H_2][CO_2]/\{[CO][H_2O]K_{eq}(T)\}$ and $K_{eq}(T) \approx 10^{(2073/T - 2.029)}$. In the above rate expression, the concentrations are in kmoles/m$^3$. The temperature is in degrees Kelvin (K). The factor A has units such that the rate of reaction is finally expressed in gmoles of CO/(Kg catalyst-sec). The Activation Energy is expressed in Joules/mole, and R, the universal gas constant is 8.314 Joules/(mole-K). Kinetic experiments were run to estimate the reaction rate parameters, for a broad range of reformate compositions and temperatures. Depending on the catalyst, temperature (200° C.–260° C.) and reformate composition, the values of these parameters were found in the following regimes, using state-of-the-art mathematical software to analyze and fit the experimental data:

$\alpha = 0.0 – 0.10$ $\beta = 0.80 – 0.95$ $\gamma = 0.02 – 0.08$ $\delta = 0.30 – 0.35$ Ea=14.0–20.0 kcal/mole of CO Referring to FIG. 6, there is depicted the impact on the LT WGS reactor volume and the CO concentration (via conversion) at the LT WGS reactor outlet caused by changing the CO reaction order (the $\alpha$ value in the reaction rate equation (4) above). It will be noted that if the WGS catalyst activity is substantially independent of the CO partial pressure, as for approximately zero order CO kinetics, the volume of the LT WGS reactor may be relatively small, or reduced. Moreover, it reveals that a close approach to equilibrium is feasible at temperatures below 250° C. If the WGS catalyst activity is dependant on the CO concentration to the first power, e. g. $\alpha=1$, the LT WGS reactor volume required to go from 85% to 97% of the equilibrium value increased three-fold. This is depicted by trace "$\alpha=1$" in FIG. 6. However, if that catalyst activity is substantially independent of the CO partial pressure in the range of interest, e. g. $\alpha=0$, the reactor size required to approach 97% of equilibrium conversion is only about 60% of that needed to reach 85% of equilibrium in the prior example, where $\alpha=1$. This is depicted by trace "$\alpha=0$". Clearly, then, in the latter instance it is possible to obtain a relatively large conversion of CO with a relatively smaller LT WGS reactor volume, thus allowing the elimination of the H PROX subsystem. Similarly, it also allows reduction of CO concentration along the LT WGS reactor to levels predicted by the thermodynamic equilibrium equation, allowing a relatively smaller LT WGS reactor volume than required by another catalyst of similar activity but high CO reaction order. This affords savings in reactor hardware costs and a reduction in system parasitic power.

In general, the $CO_2$ in the reformate has a negative impact on the activity of these catalysts that is expressed with a negative reaction order dependence on the $CO_2$ concentration. However, the activity of the high activity catalysts in accordance with the invention is practically independent of the $CO_2$ concentration, with a $CO_2$ reaction order between −0.02 and −0.08, while similar recently-developed, noble metal-based catalysts have relatively more negative $CO_2$ reaction orders.

Figure 7:
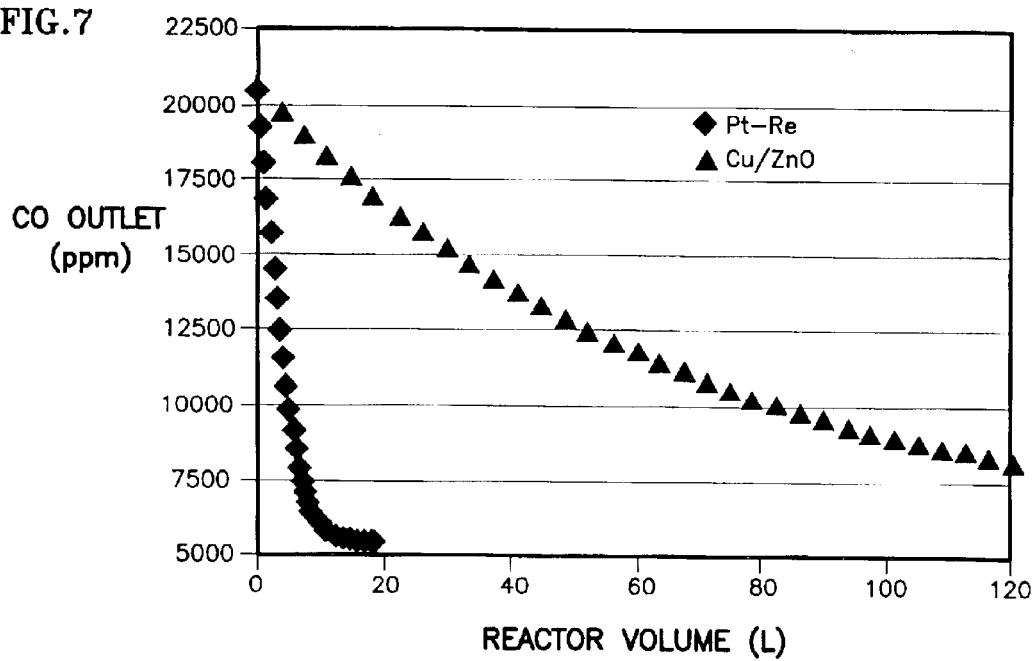
FIG. 7 is a graphical comparison of the required reactor size for a commercially available pyrophoric Cu/ZnO LT WGS catalyst vs. that for the high-performance and lower exothermicity noble metal over doped ceria catalyst in accordance with the invention.

Cu/ZnO is a commercially available, low cost, LT WGS catalyst that operates at low temperatures in the 200–240° C. regime. However, in addition to its pyrophoricity when exposed to air which is a significant limitation in using this catalyst in a fuel cell power plant, especially for automotive applications that employ on board fuel reforming, the dependence of its reaction rate on CO concentration results in the required reactor being at least 10 times larger relative to that required for the high activity catalysts in accordance with the invention, as comparatively depicted in FIG. 7. This Figure specifically corresponds to a LT WGS reactor in a 150 KWe fuel cell power plant that uses natural gas as a fuel in the fuel processor. State-of-the-art mathematical models and software that integrate reaction engineering, thermodynamics, transport phenomena, energy, mass and momentum conservation differential equations with the appropriate boundary conditions were applied to estimate the reactor size. ⅛" extrudates were assumed for calculating the Cu/ZnO reactor volume while a 200 cpsi honeycomb monolith, wash-coated with 250 grams of catalyst per liter of reactor was assumed for the Pt-based high activity LT WGS catalyst with the previously described characteristics.

Figure 8A:
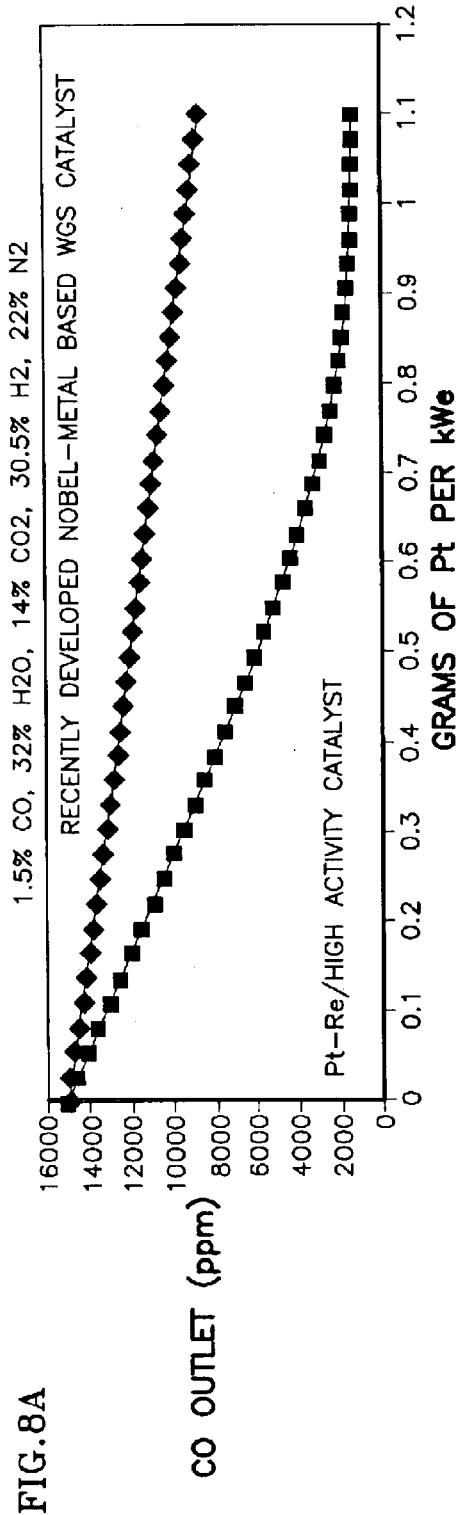
FIGS. 8A and 8B are graphical comparisons of the amount of Pt per Kwe of power vs. the reactor CO outlet concentration for both the LT WGS Pt—Re catalyst in accordance with the invention and a recently developed noble metal-based WGS catalyst, for respective different gas reformate compositions.
Figure 8B:
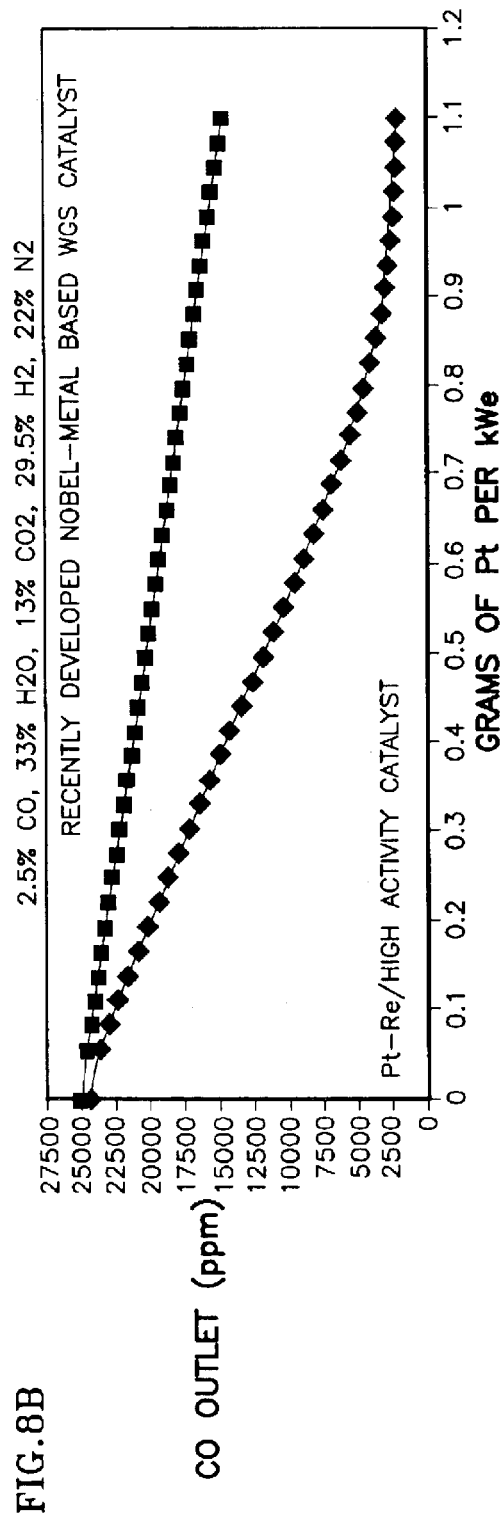

The importance of having a high catalyst activity per weight of Pt is illustrated in FIGS. 8A and 8B. These Figures each depict the required amount of Pt per KWe of the fuel cell power plant as a function of the CO outlet concentration in the LT WGS reactor with an outlet temperature of ~250° C., both for the high activity Pt—Re catalyst of the invention having the previously mentioned characteristics in activity, activation energy and CO, $H_2O$, $CO_2$ and $H_2$ reaction rate order and for the recently-developed, noble metal-based WGS catalyst. FIG. 8A is for an inlet reformate composition of: 1.5% CO, 32% $H_2O$, 14% $CO_2$, 30.5% $H_2$, 22% $N_2$ and FIG. 8B is for an inlet reformate composition of 2.5% CO, 33% $H_2O$, 13% $CO_2$, 29.5% $H_2$, 22% $N_2$. The relative improvement of performance of the Pt—Re catalyst over the recently-developed, noble metal-based catalyst is clearly depicted. In each instance, the use of the Pt—Re catalyst of the invention allows elimination of the H PROX subsystem at a temperature of 250° C. or lower, with a low Pt amount and thus, reactor cost.

Again, estimation of the Pt amount in FIGS. 8A and 8B were made under the assumption of 250 grams of catalyst per liter of reactor volume containing the catalyst and, with respect to the Pt-based catalysts, 2.5 wt. % of Pt on the catalyst.

In view of the foregoing discussion, the selection of catalyst for use in at least the LT WGS reactor is important. That catalyst should be capable of activity at relatively low temperatures below about 250° C. Catalysts possessing these characteristics are to be found amongst the noble metal-on-ceria-based nanophase structure catalysts. A particular example of a suitable high activity catalyst is a Pt—Re mixed metal cluster on a nano-crystalline, large pore, controlled density, cerium oxide-based catalyst, as in FIGS. 8A and 8B, with at least 0.5 wt % of Pt and Re and having Pt and Re dispersion greater than 90% on a porous mixed metal oxide support. More particularly, the Pt content is preferably between 1.0 and 5.0 wt %, and most preferably between about 1.7 and 3.5 wt %, with a Re to Pt mole ratio from about 0.5 to about 2.0, and preferably 0.75 to 1.5. The pore structure of the porous support results substantially from the spaces between the non-porous mixed metal nanocrystallites that have an average size, as measured by Powder X-ray Diffraction line broadening, of 2 to 4 nm, and are so arranged as to give an average pore size of at least 4 nm but less than 9 nm. The average elemental analysis of these individual nano-crystals is comparable to the average elemental analysis of the bulk mixed metal oxide. The composition of the bulk mixed metal oxide is: cerium, between 45% and 85%; zirconium or hafnium, or mixtures thereof, between 15% and 55%; one or more members of the group: Nb, Ta, Mo, and W, between 0% and 10%; and one or more members of the group: Y, La, Pr, Nd, Sm, Eu, Gd, Tb, Dy, Ho, Er, Tm, Yb, and Lu, between 0% and 20%; and where all percentages are on a metals-only atomic basis. The mixed metal oxide has a surface area of at least 350 $m^2/cm^3$ as a washcoat or packed powder, and a surface area on a weight basis, adjusted to a skeletal density of 6.4 $g/cm^3$ of at least 150 $m^2/gm$.

Additional description of the catalyst discussed in the preceding paragraph, and particularly the Pt—Re mixed metal cluster embodiment, as well as the manufacture thereof, may be found in U.S. application Ser. No. 10/402,808, entitled Ceria-Based Mixed-Metal Oxide Structure, Including Method of Making and Use (C-2727A) and filed Mar. 28, 2003, and assigned to the same assignee as the present application, which application is incorporated herein by reference to the extent required herein.

Figure 9:
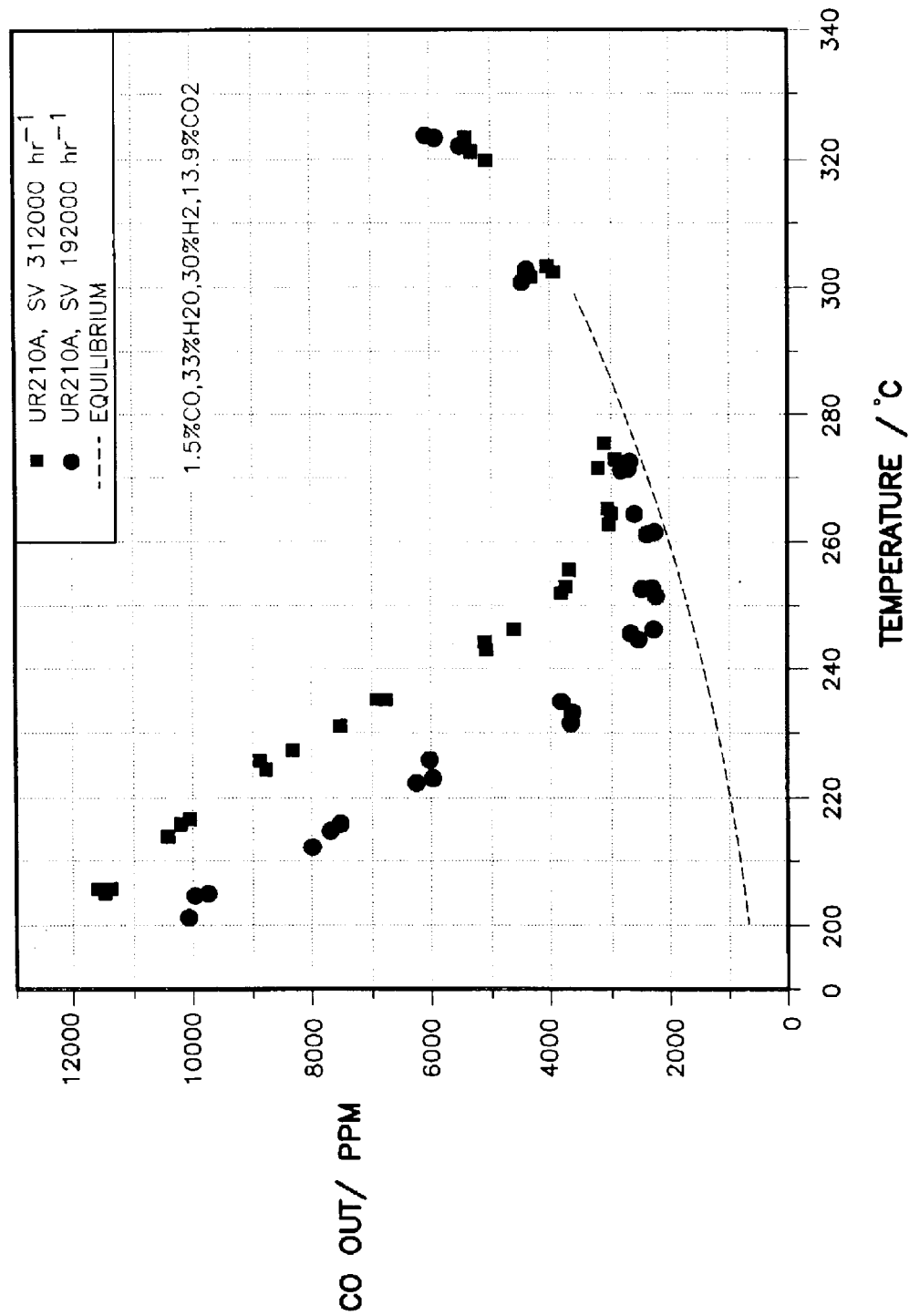
FIG. 9 graphically depicts the ability of the LT WGS high-performance catalyst in accordance with the invention to reduce reformate CO concentration to 2,000 ppmv at 250° C. with a space velocity of 192,000 $cm^3$ reformate gas/$cm^3$ catalyst-$hr^{-1}$, where the volumetric flow rate of the reformate gas (in $cm^3$/hr) corresponds to STP conditions i.e., temperature of 0° C. and pressure of 1 atm.

FIG. 9 illustrates with an experimental test that this catalyst is capable of producing 2,000 ppmv of CO at the LT WGS reactor outlet with highly dispersed Pt—Re over a Ce-based oxide. The primary data depicted in FIG. 9 are for a space velocity (SV) of 192,000 $cm^3$ reformate gas/$cm^3$ catalyst-$hr^{-1}$ or 192,000 $h^{-1}$, where the volumetric flow rate of the reformate gas (in $cm^3/hr$) corresponds to STP conditions i.e., temperature of 0° C. and pressure of 1 atm. This means that the actual space velocity under a temperature of the experiment, T, in ° C., will be equal to 192,000×(273.2+T)/273.2. For example, at 250° C. the SV will be 192,000×(273.2+250)/273.2=367,695 $h^{-1}$.

Figure 1:
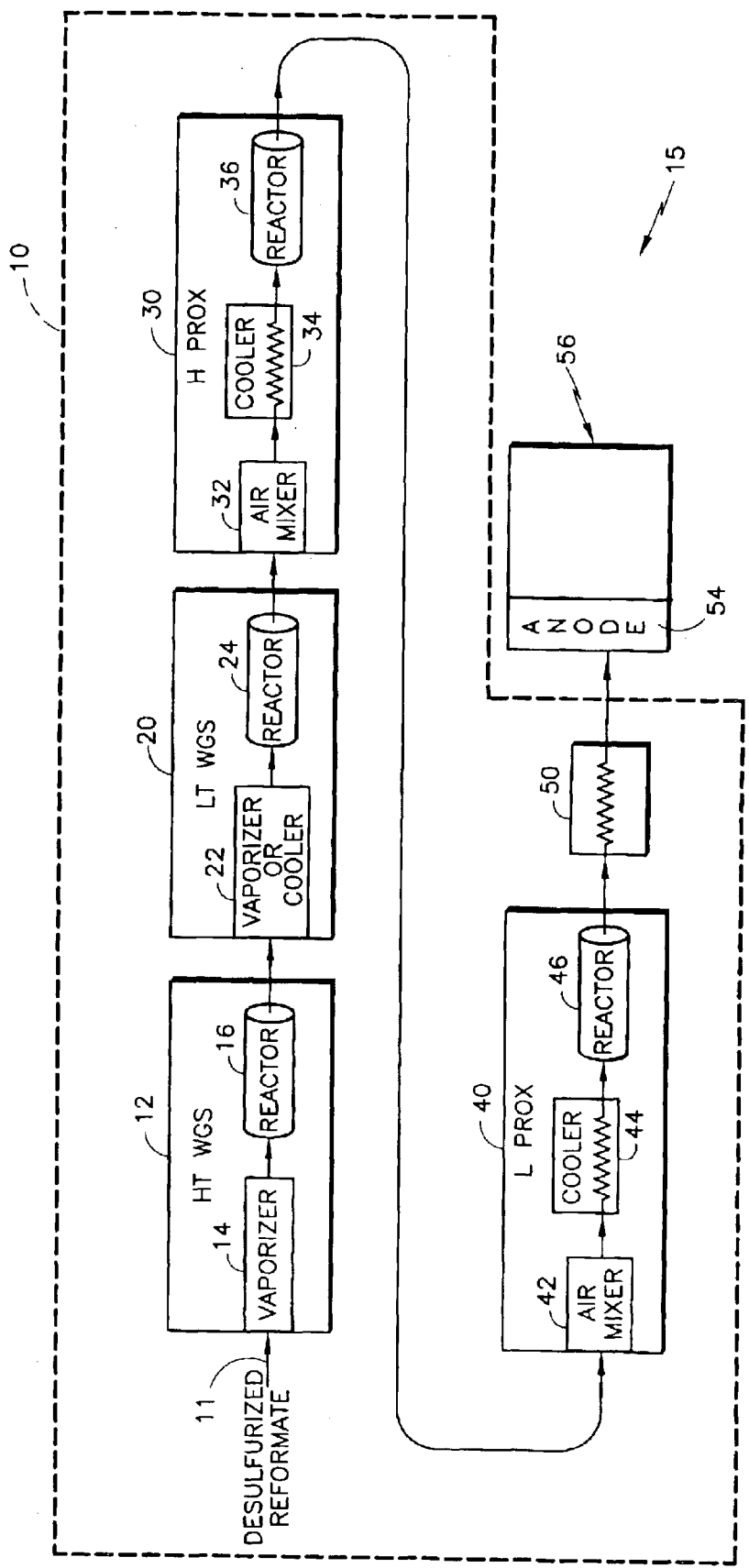
FIG. 1 is a schematic diagram of a prior-art fuel processing system for a fuel cell power plant, including high and low temperature WGS subsystems and high and low temperature PROX subsystems.
Figure 4:
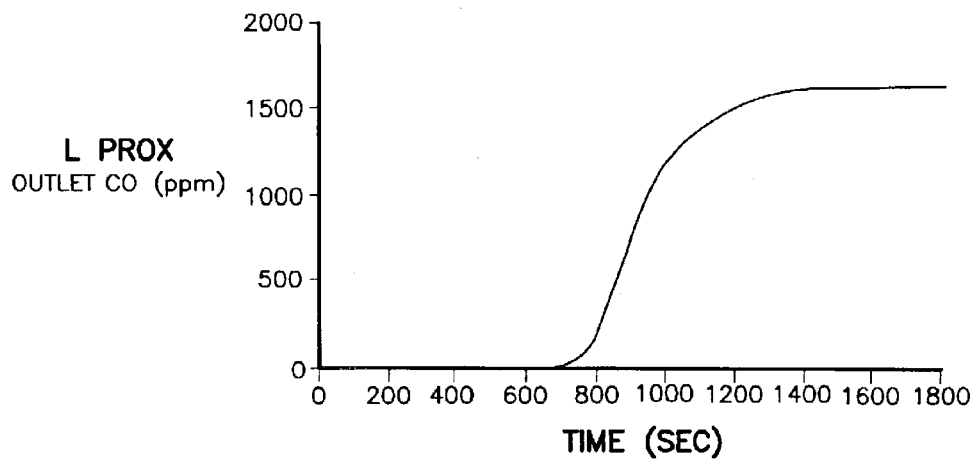
FIG. 4 is a graphical depiction of the effect of a down-step in power on the CO concentration at the outlet of the L PROX of the FIG. 1 system, assuming the system lacks an active and complex flow control system.
Figure 10:
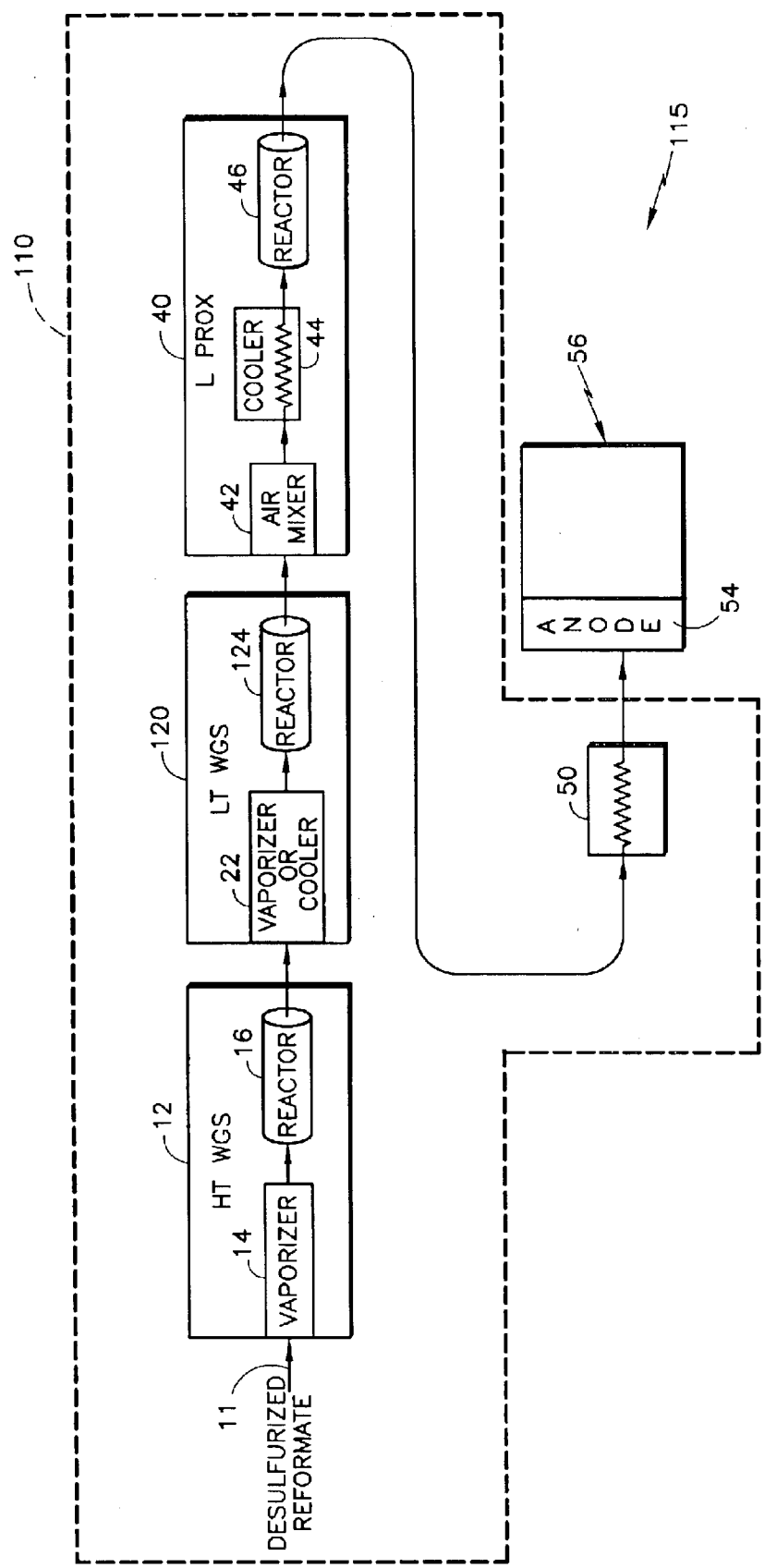
FIG. 10 is a schematic diagram of the power plant fuel processing system in accordance with the invention, depicting the absence of the H PROX section.

Reference is now made to FIG. 10 for an understanding of the benefits of the FPS of the present invention relative to the prior art FPS 10 of FIG. 1. Reference numbers identical to those of FIG. 1 are used in FIG. 10 for those components that are the same, or substantially the same, in the two configurations. However, where there is some functional, compositional, or structural difference occasioned by the invention, but the components of FIG. 10 nevertheless remain analogous to components in FIG. 1, they have been given the same reference number, but preceded by a "1". The fuel cell power plant 115 includes an FPS 110 that receives, at HT WGS 12, reformate from fuel that has been desulfurized and reformed prior thereto. Requisite supplies and control of air, steam and/or water to the relevant sections of the FPS 110, though not shown, are implied and well understood. The HT WGS section 12 is the same as for the FIG. 1 embodiment, and includes a water vaporizer or heat exchanger 14 and reactor 16. The temperature and CO level of the reformate exiting the HT WGS 12 are substantially the same as for the FIG. 1 embodiment. The LT WGS 120 is similar, but not identical, to the LT WGS 12 of FIG. 1. It differs in that the catalyst used is a high activity, low temperature catalyst having the properties described above of being very active at temperatures below 250° C., and the reactor 124 containing the catalyst may now be relatively smaller. It will be noted that the LT WGS section 124 and its included catalyst are capable of activity with respect to the reformate to temperatures equal or lower than about 250° C. and thereby provide a CO level of about 2000 ppmv or lower. This temperature and CO level of the reformate are sufficiently low that the reformate may be, and is, supplied directly to the L PROX subsystem 40 without requiring the H PROX subsystem 30 of FIG. 1. The reformate discharged from the L PROX subsystem 40, and particularly reactor 46, of FPS 110 is then at substantially the same temperature and CO concentration (<50 ppmv and preferably less than 10 ppmv) as from the L PROX subsystem 40 of the FPS 10 of the FIG. 1 embodiment.

The omission of the H PROX section represents a significant savings in terms of hardware and associated weight, volume, cost, and maintenance. Moreover, the elimination of the H PROX section obviates some of the need for a sophisticated coolant control system, and the coolant and air supply scheme for the sections of FPS 110 may now be generally proportional, and thus less complex and less expensive. Finally, the efficiency of the fuel cell power plant system 115 is increased by at least 1% because an additional 0.5–1 mole % $H_2$ is now produced in the LT WGS subsystem 120 and an additional 1–2 mole % $H_2$ is saved that would otherwise have been consumed in the omitted H PROX reactor (36 of FIG. 1).

Although the invention has been described and illustrated with respect to the exemplary embodiments thereof, it should be understood by those skilled in the art that the foregoing and various other changes, omissions and additions may be made without departing from the spirit and scope of the invention.

What is claimed is:

1. In a fuel processing system (FPS) (110) for a fuel cell power plant (115) including a fuel cell stack assembly (CSA) (56), the FPS (110) including at least a water gas shift (WGS) reaction section (12, 120) for receiving hydrocarbon reformate containing CO and reducing the concentration of CO in the reformate via the shift reaction, and at least a preferential oxidation (PROX) section (40) for further reducing the concentration of CO in the reformate to a concentration acceptable for operating the CSA (56), the improvement wherein:

the WGS section (12, 120) includes a low temperature reactor (124) with a high activity catalyst therein for reducing the concentration of CO in the reformate to a relatively low level, thereby relatively reducing the structural volume of the FPS (110), said high activity catalyst comprises a noble-metal-on-ceria based, nanophase-structure catalyst in the low temperature reactor (124) of the WGS section (120) being active at temperatures as low as 250° C.

2. The fuel processing system of claim 1 wherein the high activity catalyst in the low temperature WGS reactor (124) reduces the concentration of CO in the reformate to about 2,000 ppmv or less.

3. The fuel processing system of claim 2 wherein the PROX section (40) comprises a low temperature PROX reactor (46), the low temperature PROX reactor (46) being the only PROX reactor in the FPS (110).

4. The fuel processing system of claim 3 wherein the concentration of CO in the reformate following the further reduction thereof in the low temperature PROX reactor (46) is less than about 10 ppmv.

5. The fuel processing system of claim 2 wherein said high activity catalyst with said reactor (124) of the WGS section (120) comprises a noble-metal-on-ceria-based, nanophase-structured catalyst.

6. The fuel processing system of claim 5 wherein said noble-metal-on-ceria-based catalyst comprises platinum (Pt) and rhenium (Re) mixed metal on a nanocrystaline, cerium oxide-based support.

7. The fuel processing system of claim 1 wherein said noble-metal-on-ceria-based catalyst comprises platinum (Pt) and rhenium (Re) mixed metal on a nanocrystaline, cerium oxide-based support.

8. The fuel processing system of claim 7 wherein said high activity catalyst has a catalyst activity of at least 0.18 moles of CO per moles of Pt per sec. (moles CO/moles Pt-sec.) at 250° C. for a gas composition of 1.5%–2.5% CO, 25%–35% $H_2O$, 30–50% $H_2$, 10–14% $CO_2$, balance $N_2$, a CO reaction order in the range of 0.0 to 0.10 and an activation energy of up to about 20 Kcal/mole CO.

9. In a fuel processing system (FPS) (110) for a fuel cell power plant (115) including a fuel cell stack assembly (CSA) (56), the FPS (110) including at least a water gas shift (WGS) reaction section (12, 120) for receiving hydrocarbon reformate containing CO and reducing the concentration of CO in the reformate via the shift reaction, and at least a preferential oxidation (PROX) section (40) for further reducing the concentration of CO in the reformate to a concentration acceptable for operating the CSA (56), the improvement wherein:

the WGS section (12, 120) includes a low temperature reactor (124) with a high activity catalyst for reducing the concentration of CO in the reformate to a relatively low level, thereby relatively reducing the structural volume of the FPS (110), said high activity catalyst in the low temperature reactor (124) of the WGS section (120) comprising a noble-metal-on-ceria-based, nanophase-structured catalyst comprising platinum (Pt) and rhenium (Re) mixed metal on a nanocrystaline, cerium oxide-based support.

10. The fuel processing system (110) of claim 9 wherein the WGS section reactor (124) is a low temperature, WGS reactor (124), and the high activity catalyst is included therein and is active at temperatures as low as 250° C.

11. The fuel processing system of claim 9 wherein the PROX section (40) comprises a low temperature PROX reactor (46), the low temperature PROX reactor (46) being the only PROX reactor in the FPS (110).

12. The fuel processing system of claim 11 wherein the concentration of CO in the reformate following the further reduction thereof in the low temperature PROX reactor (46) is less than about 50 ppmv.

13. In a fuel processing system (FPS) (110) for a fuel cell power plant (115) including a fuel cell stack assembly (GSA) (56), the FPS (110) including at least a water gas shift (WGS) reaction section (12, 120) for receiving hydrocarbon reformate containing CO and reducing the concentration of CO in the reformate via the shift reaction, and at least a preferential oxidation (PROX) section (40) for further reducing the concentration of CO in the reformate to a concentration acceptable for operating the CSA (56), the improvement wherein:

the WGS section (12, 120) includes a low temperature reactor (124) with a high activity catalyst for reducing the concentration of CO in the reformate to a relatively low level, thereby relatively reducing the structural volume of the FPS (110), said high activity catalyst in the low temperature reactor (124) of the WGS section (120) including at least platinum and having a catalyst activity of at least 0.18 moles of CO per moles of Pt per sec. (moles CO/moles Pt-sec.) at 250° C. for a gas composition of 1.5%–2.5% CO, 25%–35% $H_2O$, 30–50% $H_2$, 10–14% $CO_2$, balance $N_2$, a CO reaction order in the range of 0.0 to 0.10 and an activation energy of up to about 20 Kcal/mole CO.

14. The fuel processing system of claim 13 wherein said high activity catalyst with said reactor (124) of the WGS section (120) comprises a noble-metal-on-ceria-based, nanophase-structured catalyst comprising platinum (Pt) and rhenium (Re) mixed metal on a nanocrystaline, cerium oxide-based support.

15. The fuel processing system of claim 14 wherein the high activity catalyst in the low temperature WGS reactor (124) reduces the concentration of CO in the reformate to about 2,000 ppmv or less.

16. The fuel processing system of claim 15 wherein the PROX section (40) comprises a low temperature PROX reactor (46), the low temperature PROX reactor (46) being the only PROX reactor in the FPS (110).

17. The fuel processing system of claim 13 wherein said high activity catalyst with said reactor (124) of the WGS section (120) comprises at least platinum on a nanocrystaline, cerium-based mixed metal oxide support, the mixed metals of said support, in addition to cerium, further including at least a second metal, or mixture thereof, selected from the group consisting of Zr arid Hf, and a third metal, or mixture thereof, selected from the group consisting of Nb, Ta, Mo and W.

18. The fuel processing system of claim 17 wherein the cerium-based mixed-metal oxide support of said high activity catalyst has a surface area on a weight basis of at least about 150 $m^2$/g, an average crystallite size of about 2 to 4 nm and agglomerated to form a skeletal structure with pores, average pore diameters being between about 4 and 9 nm and normally being greater than the average crystallite size, and wherein the surface area of the skeletal structure per volume of the material of the structure is greater than about 350 $m^2/cm^3$.

* * * * *